US006952516B2

(12) United States Patent
Takahashi et al.

(10) Patent No.: US 6,952,516 B2
(45) Date of Patent: *Oct. 4, 2005

(54) LOW ATTENUATION OPTICAL FIBER

(75) Inventors: Fumio Takahashi, Tokyo (JP); Jun-ichi Tamura, Tokyo (JP); Akira Iino, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,578

(22) Filed: Jul. 8, 2004

(65) Prior Publication Data

US 2004/0258380 A1 Dec. 23, 2004

Related U.S. Application Data

(63) Continuation of application No. 10/073,900, filed on Feb. 14, 2002, now Pat. No. 6,782,173.

(30) Foreign Application Priority Data

Feb. 27, 2001 (JP) ........................................ 2001-052971

(51) Int. Cl.$^7$ ................................................. G02B 6/16
(52) U.S. Cl. ........................ 385/123; 385/124; 385/126
(58) Field of Search ................................ 385/123–128, 385/141–145; 65/424, 426

(56) References Cited

U.S. PATENT DOCUMENTS

| 6,104,528 | A | 8/2000 | Hwang |
| 6,687,444 | B2 * | 2/2004 | Antos et al. ................. 385/123 |
| 6,704,485 | B1 | 3/2004 | Campion et al. |
| 6,782,173 | B2 * | 8/2004 | Takahashi et al. .......... 385/123 |
| 2002/0051612 | A1 | 5/2002 | Shimizu et al. |
| 2004/0047576 | A1 | 3/2004 | Kurusu et al. |

FOREIGN PATENT DOCUMENTS

| EP | 0 283 748 | 9/1988 |
| EP | 0 673 895 | 9/1995 |
| EP | 1 030 199 | 8/2000 |
| EP | 1 202 086 | 5/2002 |

OTHER PUBLICATIONS

Corning Product Information, XP–002969061, pp. 1–4, "Corning Leaf CPC6 Single–Mode Non–Zero Dispersion–Shifted Optical Fiber", 1998.
R. McMahon, Laser Focus World, XP–008031705, pp. 65–66, "Nonzero–Dispersion–Shifted Fiber: The Choice For DWDM", Jan. 2001.
OFS: OFS TrueWave RS Fiber, OFS Technical Disclosure, 'Online!, pp. 1–4, XP–002285177, "Optimized to Enable the Lowest Total Systems Cost for EDFA Amplified Networks in the Metro Express, Regional, and Long Haul Application Spacei", 2003.
Rossaro, et al., Telecom Italia Lab., 'Online!, p. 29–31, XP–002285178, "Non–Zero Dispersion Fibres: Markets and Standards", Mar. 2002.
M. Ogai, et al., European Conference on Optical Communication. (ECOC), vol. 1 CONF. 12, pp. 7–10, XP–008003280, "Absorption Peak At 1.52μm Silica Fiber", Sep. 22–25, 1986.

* cited by examiner

Primary Examiner—Michelle R. Connelly-Cushwa
(74) Attorney, Agent, or Firm—Oblon, Spivak, McClelland, Maier & Neustadt, P.C.

(57) ABSTRACT

A low attenuation optical fiber which falls within 2–14 ps/nm/km in absolute value of dispersion over the full wavelength range of 1530–1565 nm and no more than 0.25 dB/km of transmission loss at 1550 nm of wavelength at ordinary temperature and relative humidity, and still remains no more than 0.25 dB/km of transmission loss at 1550 nm or 1520 nm after its being long-enough exposed under ordinary atmospheric pressure consisting substantially of hydrogen; and which further comprises a polarization mode dispersion (PMD) of no more than 0.5 ps/√km at a wavelength of 1550 nm and a loss increase of no more than 40 dB/m in a bending diameter of 20 mm.

4 Claims, 1 Drawing Sheet

LOW ATTENUATION OPTICAL FIBER

CROSS REFERENCE OF THE RELATED APPLICATION

This application is a continuation application of Ser. No. 10/073,900 filed Feb. 14, 2002, now U.S. Pat. No. 6,782,173, and claims priority to the Japanese Application No. 2001-052971, filed Feb. 27, 2001, the entire contents of which being incorporated herein by reference.

FIELD OF THE INVENTION

The present invention relates to low-attenuation optical fibers suitable for wavelength-division-multiplexing (WDM) optical transmission systems.

BACKGROUND OF THE INVENTION

Vigorous studies have been given on techniques to increase the capacity of optical-fiber transmission with optical fibers.

It is believed that a growth of optical transmission capacity requires the optical fibers for the optical transmission to enable single-mode transmission at the operating wavelength, because the groupings of different speeds of optical signals in various modes can induce mode dispersion inevitably in the propagation through an optical fiber. As a result, the signal waveforms can decay or warp.

Consequently, the single-mode fiber (SMF) was started in use, having a zero-dispersion wavelength around 1.3 $\mu$m. At the zero-dispersion wavelength, the fiber was able to have a transmission distance of scores of kilometers, and a transmission capacity of hundreds of Mbps (megabits per second).

In the meantime, the least transmission loss in optical fiber takes place at 1.55 $\mu$m of wavelength, where a dispersion-shifted fiber (DSF) with a zero-dispersion wavelength of 1.55 $\mu$m or thereabout was developed. This optical fiber enabled the optical transmission optical transmission with a capacity of several gigabits per second around 1.55 $\mu$m of wavelength. The same single-mode fibers were laid in long-distance optical transmission routes each with a capacity of several G bit/s in a 1.55 $\mu$m wavelength band.

In the latter half of the 1980s it was discovered that transmission loses would increase in an optical fiber in which hydrogen molecules, from a hydrogen gas (H2) trapped in the cable, had been broken. On analysis, the loss increase was assignable to absorption peaks in the transmission-loss spectrum, which hydrogen molecules had induced in the optical fiber. Hydrogen-induced absorption peaks emerge around 1.24 $\mu$m, and at 1.52 $\mu$m and on the longer-wavelength side. The absorption peaks at 1.52 $\mu$m and the longer wavelength were seen to have an adverse impact on the optical transmission around 1.55 $\mu$m, firsthand, for instance, as described in ECOC '86, pp 7–10, by Ogai et al.

Concurrently, in terms of 1.31 $\mu$m transmission SMF and 1.55 $\mu$m transmission DSF, assorted R&D approaches were made to prevent the hydrogen-induced loss increase, from the aspect of fabrication technique or fiber coating material. For example, optical-fiber cables for terrestrial application were usually filled with a filling compound so as to reduce the amount of trapped gaseous hydrogen. Accordingly, no hydrogen-proofing techniques were explored (see e.g., Bellcore-GR-20-Core issue 2, Jul. 1998, Section 6.6.9).

In the recent years, in search for more capacities of optical transmission systems, the designs of wavelength division multiplexing (WDM) have been studied and developed, producing volumes of reports on optimizing optical fibers for WDM transmission.

From the angle of evading four-wave mixing, the optical fibers for WDM optical transmission systems are required to be unequipped with a zero-dispersion wavelength in their operating wavelength bands. In this context, a non-zero dispersion shifted fiber (NZDSF) has been developed, without any zero dispersion in the operating wavelength band. In general, NZDSFs are required to have even more complicated refractive-index (RI) profiles, than those of SMFs or DSFs, because they need to gear with additional requirements for a large effective core area (Aeff), a reduced dispersion slope, etc. to provide for high-density WDM (DWDM) optical transmission.

Complicated RI profile designs of NZDSFs accompany a propensity to induce minute glassmaking flaws in optical fibers, along with irksome process control.

Although NZDSFs are in use to cover a broad wavelength band including 1.55 $\mu$m, no hydrogen-proof treatment techniques were then disclosed to the public.

In the recent years, cables to shroud optical fibers have structurally been reviewed and improved. In fact, optical fiber cables are shifting in great numbers from a compound-filled type to a dry-core type which contains a water absorbent material in the cable instead of a filling compound. The filling-compound free cable fabrication is far less toilsome (not required to wipe clean the cables). Also the filled cables could hardly be enhanced in fire resistance, but filling-compound free (dry-type) cables can readily be attached with enhanced fire resistance. A sample dry-core type of optical fiber cable is described in U.S. Pat. No. 5,422,973.

The dry-core type contains a water absorbent material in the cable to block out lengthwise, water penetration, which contacts wet, swells and dams off the water. But then, the water absorbent material has an action to lead in ambient humidity (moisture), even without any cable damage or opening, and poses a threat of allowing the trapped wet (absorbed ambient moisture) to react with component metals inside the cable, where hydrogen ions emerge. Accordingly, even optical fibers for terrestrial cables need to be considered about their hydrogen-proof treatment.

For instance, U.S. Pat. No. 6,131,415 describes an optical fiber with a thought of hydrogen-proof performance (hydrogen resistance), and a technique for suppressing the hydroxyl-ion concentration in an optical fiber to reduce the transmission loss at 1385 nm. In particular, the present patent owner, Lucent Technologies, discloses in "Catalog Allwave," certain information about a required design concept of hydrogen-proof performance (hydrogen resistance) of optical fibers for metropolitan use.

Moreover, U.S. Pat. Nos. 5,838,866 and 6,128,928 each describe an optical fiber with a thought of hydrogen resistance. Each fiber is designed to be equipped with hydrogen resistance by making the (inner) clad contain germanium to a degree to raise its refractive index, not in substance.

However, U.S. Pat. No. 6,131,415 remarks on no more than a technique for suppressing the loss increase at 1385 nm, arising out of absorption peaks of hydroxyl ions, without any remarks on the loss increase at 1520 nm, due to the absorption peaks of hydrogen molecules.

Moreover, none of the techniques in U.S. Pat. Nos. 6,131,415, 5,838,866 and 6,128,928 involve any additives to bring on substantial shifts in the refractive-index profile in each clad region. Thus, these three patents are expected to aim for characteristic improvements in "SMF" or the equivalent, but not NZDSF for WDM optical transmission systems.

SUMMARY OF THE INVENTION

A purpose of the present invention is to provide low-attenuation fibers, or specifically, a low-attenuation fiber which comprises:

a dispersion D of 2.0 to 14.0 ps/nm/km in a wavelength range of 1530 to 1565 nm in absolute value, a transmission loss of 0.25 dB/km or less under the standard atmospheric conditions, wherein the transmission loss at 1550 nm and/or 1520 nm in wavelength is made not to exceed 0.25 dB/km, as a result of being exposed to an atmosphere composed substantially of hydrogen under the ordinary atmospheric pressure at ordinary temperature for a certain period. The standard atmospheric conditions refer to definitions in JISC0010, Section 5 and are made up of ordinary temperature (25±10° C.), ordinary relative humidity (25–75%) and ordinary atmospheric pressure (86–106 kPa). In addition, the certain period need to be no less than a time lapse in which hydrogen penetrates the midmost/core of an optical fiber. In effect, the hydrogen penetration is represented by at least 0.03 dB/km of loss increase around 1.24 $\mu$m.

LEGEND

Figure 1:
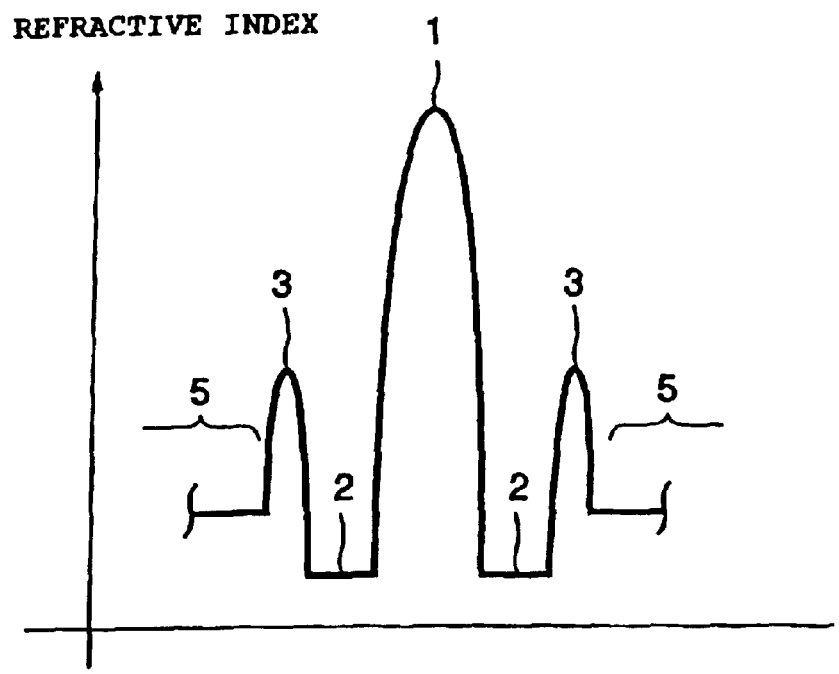
FIG. 1 is a complicated refractive-index (RI) profile for a low attenuation optical fiber of one embodiment in the present invention.

1 Core region
2 1st annular region
3 2nd annular region
4 3rd annular region
5 Clad

DETAILED DESCRIPTION

The present invention is designed to provide hydrogen-proof optical fibers with moderate dispersions in a wavelength band between 1530 and 1565 nm and transmission losses remaining almost constant over time.

The present invention recites a low attenuation optical fiber which falls within 2–14 ps/nm/km in absolute value of dispersion over the wavelength range of 1530–1565 nm and no more than 0.25 dB/km of transmission loss at 1550 nm of wavelength at ordinary temperature and relative humidity, and still remains no more than 0.25 dB/km of transmission loss at 1520 rim of wavelength even after its being long-enough exposed under ordinary atmospheric pressure consisting substantially of hydrogen.

The present invention recites a low attenuation optical fiber which falls within 2–14 ps/nm/km in absolute value of dispersion over the wavelength range of 1530–1565 nm and no more than 0.25 dB/km of transmission loss at 1550 nm of wavelength at ordinary temperature and relative humidity, and still remains no more than 0.25 dB/km of transmission loss at 1520 nm of wavelength even after its being long-enough exposed under ordinary atmospheric pressure consisting substantially of hydrogen.

The present invention recites a low attenuation optical fiber, which further comprises a dispersion slope of no more than 0.15 ps/nm$^2$/km over the wavelength band of 1530–1565 nm, a PMD of no more than 0.5 ps/√km at a wavelength of 1550 nm and a loss increase of no more than 40 dB/m in a bending diameter of 20 mm.

The present invention recites a low attenuation optical fiber, which further comprises 90 $\mu$m$^2$ of Aeff.

The present invention recites a low attenuation optical fiber, which further comprises a dispersion slope of 0.04–0.08 ps/nm$^2$/km over the wavelength band of 1530–1565 nm, an absolute value of dispersion of 6–10 ps/nm/km over the wavelength band of 1530–1565 nm and an Aeff of 40–70 $\mu$m$^2$.

Building blocks of the present invention as claimed up to now can make optical fibers suitable for the WDM optical transmission in a wavelength band of 1530–1565 nm.

The numerical limitations in the Claims are rounded in a method as authorized by ASTM E29.

An embodiment of the present invention is explained with drawings from now onward.

FIG. 1 is displays a complicated refractive-index (RI) profile for a low-attenuation optical fiber of the present invention. FIG. 1 shows the midmost (core) region 1 and a clad 5, between which a first annular region 2 and a second annular region 3 are located. The maximum refractive indices (RI) in the core and second regions 1 and 3 are larger than in the clad 5. The first annular region 2 is lower in refractive index than clad 5.

Figure 2:
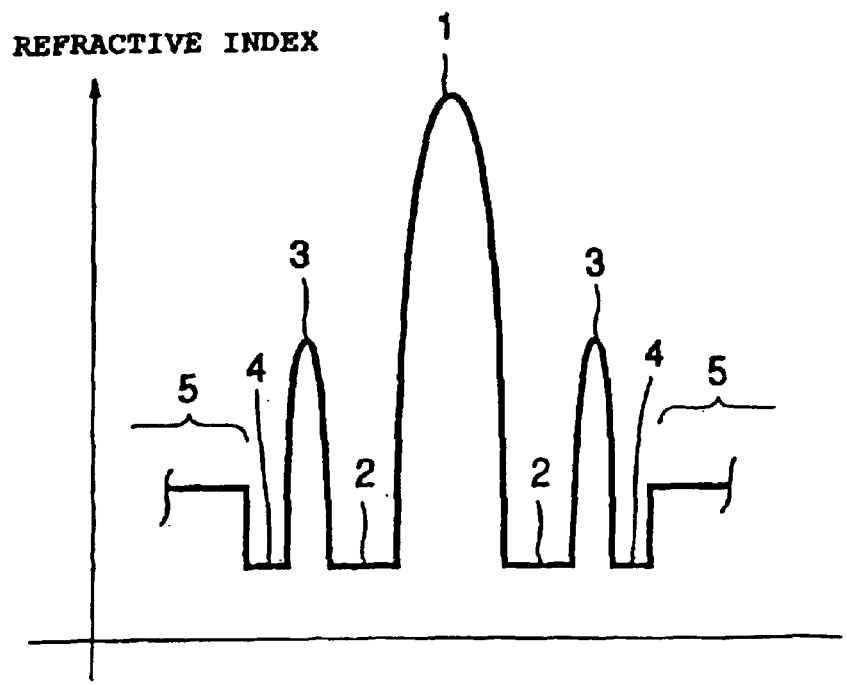
FIG. 2 is a second complicated refractive-index (RI) profile for a low attenuation optical fiber of another embodiment in the present invention.

FIG. 2 shows a second complicated refractive-index (RI) profile which an optical fiber of the embodiment may have. The profile in FIG. 2 has the midmost (core) region 1 and a clad 5, between which a first annular region 2, a second annular region 3 and a third annular region are located. The maximum refractive indices (RI) in the core and second regions 1 and 3 are larger than in the clad 5. Refractive indices in the first and third regions 2 and 4 are lower than in the clad 5.

Notably, the RI profiles in FIGS. 1 and 2 are simply samples to which law-attenuation fibers of the present invention are not limited, in RI profile, provided that any RI profiles regarded as accordant with the present invention can be accepted.

In this embodiment, optical fibers are designed to have an absolute value of dispersion=2 ps/nm/km≦|D|≦14 ps/nm/km over the wavelength ($\lambda$) range of 1530 nm≦$\lambda$≦1565 nm. It is because, in the wavelength ($\lambda$) range of 1530 nm≦$\lambda$≦1565 nm, a four wave mixing impact is undesirably large at an absolute value of dispersion: |D| less than 2 ps/nm/km; and, cumulative dispersions might unfavorably be combined to make high-density WDM optical transmission impracticable in the designed transmission routes (systems), at an absolute value of dispersion: |D| more than 14 ps/nm/km.

In contrast to conventional cases, an optical fiber of the present invention and as long-enough exposed under a ordinary atmospheric pressure consisting substantially of hydrogen at ordinary temperature can never exceed 0.25 dB/km in transmission loss at 1550 nm. The designed characteristic results from a fact of optical fibers with transmission losses in excess of 0.25 dB/km regarded as undesirable at 1520 or 1550 nm for long-distance WDM transmission, even with their having been long-enough exposed to a hydrogen atmosphere. Here, the ordinary atmospheric pressure consisting substantially of hydrogen means to yield an effect equivalent to a 100% hydrogen atmosphere; an atmosphere of at 90% hydrogen is desirable, if the remainder, 10% or less is air. The long-enough exposed means a time lapse enough to allow hydrogen to reach the core of an optical fiber. Practically, this time lapse corresponds to when a loss increase of at least 0.03 dB/km is determined at 1.24 µm.

Considering the requirements for fiber characteristics in a wavelength band of 1530–1565 nm, a range of dispersion of more than 15 ps/nm/km is undesirable, because of its making dispersions vary greatly from wavelength to wavelength in WDM optical transmission; a polarization mode dispersion (PMD) of more than 0.5 ps/√km is undesirable, because of its inducing a mass of polarization dispersion to disable WDM optical transmission; a bending loss increase of more than 40 dB/m is undesirable, because of its inducing variations in transmission loss in optical fiber cables.

In addition, more than 90 µm$^2$ of Aeff in a wavelength range of 1530–1565 nm is undesirable, because of its making the bending loss increase grow in volume hardly allowing cabling the optical fibers. Less than 40 µm$^2$ of Aeff is undesirable, because of its being more likely to induce nonlinear phenomena. In particular, more than 70 µm$^2$ of Aeff, which would be a factor in disagreeing with other characteristic requirements, ought to be studied out, against discrete system specifications in practice.

Here, the effective area (Aeff) is defined with reference to Opt. Lett., Vol. 19, No. 4, pp 257–259 (February 115, 1994).

A slope of dispersion, which would preferably be minimized, could be a factor in disagreeing with other characteristic requirements, if reduced to less than 0.04 ps/nm$^2$/km, and should be studied out, against discrete system specifications in practice, as to choice to less than 0.04 ps/nm$^2$/km. Conversely, more than 0.08 ps/nm$^2$/km of dispersion slope, with a propensity to risk the application to high-density WDM optical transmission, would preferably be studied out, against discrete system specifications in practice, as to choice to more than 0.08 ps/nm$^2$/km.

In terms of absolute values of dispersion, a four-wave mixing effect would arise below 6 ps/nm/km and cumulative dispersions would risk the application to high-density WDM optical transmission above 10 ps/nm/km. Design values of dispersion should preferably be set up, in view of discrete virtual system specifications.

In conclusion, considering the above details, it is preferable to opt for 40–70 µm$^2$ of Aeff, 0.04–0.08 ps/nm$^2$/km of dispersion slope range, and 6–10 ps/nm/km of absolute value of dispersion, in a wavelength band of 1530–1565 nm.

the hydrogen-proof treatment into the production line, more safety and less process change are the most important items to be considered. After the result in studying the condition of the hydrogen-proof treatment, we found that the hydrogen-proof treatment under ordinary atmospheric pressure at ordinary temperature could provide sufficient hydrogen resistance for the NZDSFs.

In one method, a 3 km-long coated optical fiber was led and held, for about 3 hours, in a treatment tank charged with D2 (heavy hydrogen) at almost ordinary temperature. Notably, more than two hours of remaining in a D2 atmosphere will produce a substantially constant effect, subject to a fiber length of 3 kilometers, where the hydrogen atmosphere does not need to be heated, but can produce a sufficient effect even at ordinary temperature holding time in a hydrogen atmosphere is required to be longer as the fiber under treatment becomes longer.

In the hydrogen-proof test, a 3 km-long coated optical fiber was led and held, for six hours, in a test chamber charged with H2 at ordinary atmospheric pressure and ordinary temperature; and the test chamber was recharged with nitrogen or air at ordinary temperature and the fiber was tested for transmission loss after dozens of hours. Here, more than four (4) hours of holding time in a hydrogen atmosphere will produce an almost constant effect, subject to a fiber length of three (3) kilometers. However, the holding time in a hydrogen atmosphere is required to be longer as the fiber under treatment becomes longer.

Pre/post hydrogen-proof treatment transmission losses (dB/km) are presented in Table 1, resulting from 20 sample pieces per embodiment, and consist of the discrete worst values. Note that measures (units) in the table are as follows:

Dispersion: ps/nm/km

Dispersion slope: ps/nm$^2$/km

PMD: ps/√km

Loss increase, 20 mm in bend diameter: dB/m

Aeff: µm$^2$

Values of dispersion, dispersion slope are the maximums in 1530–1565 nm. Other values are taken at a wavelength of 1550 nm.

TABLE 1

|  | RI profile | Dispersion (ps/nm/km) | Dispersion Slope (ps/nm$^2$/km) | PMD ps/√km | Bend loss (dB/m) | Aeff (µm$^2$) | 1.55 µm loss (dB/km) | | 1.52 µm loss (dB/km) | |
| --- | --- | --- | --- | --- | --- | --- | --- | --- | --- | --- |
|  |  |  |  |  |  |  | pre-test | post-test | pre-test | post-test |
| Embodiment 1 | FIG. 1 | 11 | 0.05 | 0.03 | 1 | 53 | 0.213 | 0.224 | 0.220 | 0.228 |
| Embodiment 2 | FIG. 1 | 9 | 0.06 | 0.08 | 5 | 56 | 0.201 | 0.215 | 0.209 | 0.218 |
| Embodiment 3 | FIG. 1 | 7 | 0.06 | 0.09 | 6 | 56 | 0.205 | 0.217 | 0.213 | 0.224 |
| Embodiment 4 | FIG. 2 | 5 | 0.07 | 0.12 | 15 | 57 | 0.209 | 0.221 | 0.218 | 0.227 |
| Reference 1 | FIG. 1 | 9 | 0.06 | 0.08 | 5 | 56 | 0.201 | 0.268 | 0.209 | 0.396 |
| Reference 2 | FIG. 2 | 5 | 0.07 | 0.12 | 15 | 57 | 0.209 | 0.277 | 0.218 | 0.420 |

To create optical fibers of the present invention with refractive index (RI) profiles in FIGS. 1 and 2, the fibers underwent a hydrogen-proof treatment and hydrogen-proof test so as to demonstrate the present invention.

To name but a few, the hydrogen-proof treatments include a method of superficially etching in-process performs in U.S. Pat. No. 6,131,415, a method of treating optical fibers in a heated heavy-hydrogen atmosphere (Deutrium, D2) in European Patent Application No. 0673895A2. Introducing Table 1 reveals that hydrogen-proof optical fibers have been suppressed to be less than 0.25 dB/km in transmission loss, even after each hydrogen-proof test in a hydrogen (D2) atmosphere. In contrast, References 1 and 2 without hydrogen-proof treatment, turn out to have more than 0.25 dB/km in transmission loss after hydrogen-proof test.

Moreover, it is verified that hydrogen-proof optical fibers with other RI profiles (e.g., single peaked, stepped or W pattern) than those in FIGS. 1 and 2, have incurred no increase in transmission loss in a hydrogen-proof test.

As unveiled in the above descriptions, the present invention has superior effects to facilitate the fabrication of optical fibers suited to the WDM optical transmission in a wavelength band of 1530–1565 nm.

Since the above embodiments are described only for examples, the present invention is not limited to the above embodiments and various modifications or alterations can be easily made therefrom by those skilled in the art without departing from the scope of the present invention.

What is claimed is:

1. A low attenuation optical fiber for wavelength division multiplexing, comprising:
    a light transmitting region having
        a dispersion characteristic (D) of 5.0 or more in absolute value over a wavelength band of 1530 to 1565 nm;
        a dispersion slope (S) of 0.04 ps/nm$^2$/km to 0.08 ps/nm$^2$/km over the wavelength band of 1530 to 1565 nm;
        a polarization mode dispersion characteristic (PMD) of no more than 0.12 ps/√km at a wavelength of 1550 nm;
        an effective area (Aeff) of no more than 90 $\mu$m$^2$ at the wavelength of 1550 nm;
        a loss increase of no more than 15 dB/m at the wavelength of 1550 nm as coiled in a diameter of 20 mm, and
        a transmission loss at the wavelength of 1550 nm does not exceed 0.25 dB/km under standard atmospheric conditions, wherein
    said transmission loss at the wavelength of 1550 nm does not exceed 0.25 dB/km after being exposed, for a predetermined period, to an atmosphere consisting substantially of hydrogen under ordinary atmospheric pressure at ordinary temperature.

2. The low attenuation optical fiber according to claim 1, wherein
    the light transmitting region comprises a region that has been exposed to a deuterium containing atmosphere at almost ordinary temperature before being exposed to the atmosphere consisting substantially of hydrogen.

3. A low attenuation optical fiber for wavelength division multiplexing, comprising:
    a light transmitting region having
        a dispersion characteristic (D) of 5.0 or more in absolute value over a wavelength band of 1530 to 1565 nm;
        a dispersion slope (S) of 0.04 ps/nm$^2$/km to 0.08 ps/nm$^2$/km over the wavelength band of 1530 to 1565 nm;
        a polarization mode dispersion characteristic (PMD) of no more than 0.12 ps/√km at a wavelength of 1550 nm;
        an effective area (Aeff) of no more than 90 $\mu$m2 at the wavelength of 1550 nm;
        a loss increase of no more than 15 dB/m at the wavelength of 1550 nm as coiled in a diameter of 20 mm, and
        a transmission loss at the wavelength of 1550 nm does not exceed 0.25 dB/km under standard atmospheric conditions, wherein
    said transmission loss at a wavelength of 1520 nm does not exceed 0.25 dB/km after being exposed, for a predetermined period, to an atmosphere consisting substantially of hydrogen under ordinary atmospheric pressure at ordinary temperature.

4. The low attenuation optical fiber according to claim 3, wherein
    the the light transmitting region comprises a region that has been exposed to a deuterium containing atmosphere at almost ordinary temperature before being exposed to the atmosphere consisting substantially of hydrogen.

* * * * *